Feb. 3, 1970     J. MULDER     3,492,830
COLD TRANSPORT DEVICE

Filed Dec. 27, 1967     3 Sheets-Sheet 1

INVENTOR.
JAN MULDER

BY *Frank R. Trifari*

AGENT

Feb. 3, 1970 J. MULDER 3,492,830
COLD TRANSPORT DEVICE
Filed Dec. 27, 1967 3 Sheets-Sheet 2
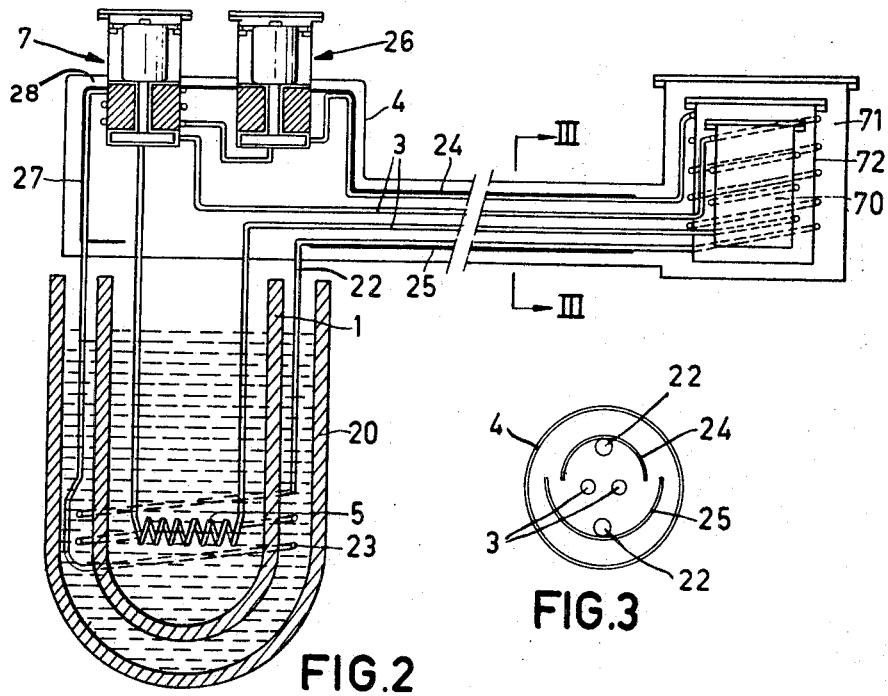
FIG.2
FIG.3
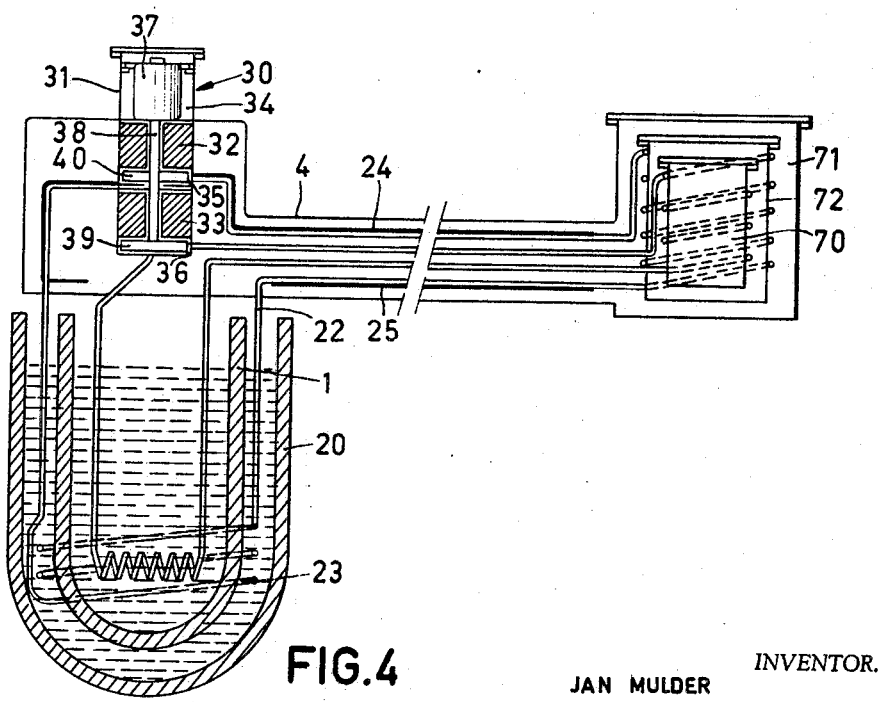
FIG.4
INVENTOR.
JAN MULDER
BY Frank R. Jufari
AGENT Feb. 3, 1970   J. MULDER   3,492,830
COLD TRANSPORT DEVICE
Filed Dec. 27, 1967   3 Sheets-Sheet 3

INVENTOR.
JAN MULDER
BY
AGENT

United States Patent Office 3,492,830
Patented Feb. 3, 1970

3,492,830
COLD TRANSPORT DEVICE
Jan Mulder, Emmasingel, Netherlands, assignor to U.S. Philips Corporation, New York, N.Y., a corporation of Delaware
Filed Dec. 27, 1967, Ser. No. 693,924
Claims priority, application Netherlands, Jan. 11, 1967, 6700374
Int. Cl. F25b 19/00
U.S. Cl. 62—45           9 Claims

ABSTRACT OF THE DISCLOSURE

Apparatus and method for transporting cold, including pump means, drive means for the pump, and a duct system by which a gaseous medium is circulated from a cold source to an object to be cooled and a vacuum-insulated housing disposed about the duct system and the pump means, whereby the drive means is maintained at a temperature substantially above that of the pump means and the duct system.

---

This invention relates to a device suitable for transporting cold between a cold source and an object to be cooled, the device comprising a system of ducts in which a medium is able to circulate and also a pumping device for circulating the medium.

If an object such as an electronic circuit or a infrared equipment is to be maintained at a low temperature, it will be necessary to supply cold to this object to compensate for the heat developed internally and inleaking heat. This cold may be supplied by a cold source, for example, in the form of a vessel containing liquid boiling at the desired temperature or a refrigerator such as a cold-gas refrigerator. For spatial and other reasons, it is often objectionable to bring the cold source into direct contact with the object to be cooled. As a result the object and the cold source must therefore be spaced apart. Then it is, however, necessary to have the disposal of a transport device which transports cold from the cold source to the object to be cooled.

One method for transporting cold from a cold source to the object to be cooled is to circulate a liquid in a system of ducts which exchanges heat with the cold source on the one hand and with the object to be cooled on the other hand. A drawback is that liquid can only be used for a very limited range of temperatures. If, for example, liquid nitrogen is used for this purpose then it will only be possible to transport cold at a temperature of approximately 77° K. If liquid helium is used then it will be possible to transport cold at a temperature of approximately 4° K. A further drawback of the use of liquid is that vapour bubbles may soon develop in the system of ducts due to inleaking heat, which gives rise to a variety of undesired complications.

An object of the invention is to provide a transport device which can transport cold at greatly divergent temperatures over a large distance and with low losses. To realize the envisaged object, the cold transport device according to the invention is characterized in that the medium in the system of ducts is gaseous, a pressure prevails in this system which is higher than the atmospheric pressure, and the pumping device is of the type by which the medium is displaced continuously. It has been found that the use of a gaseous medium under pressure in ducts having comparatively small diameters, makes it possible to transport a sufficient quantity of cold over a large distance with a satisfactory thermal efficiency. The density of the medium in the system of ducts will be high particularly at low temperatures. Since the device according to the invention comprises a pump of the type by which the medium is displaced continuously, difficulties caused by mass inertia forces which might occur in pulsating pumping devices, are now avoided.

In a further advantageous embodiment of the cold transport device according to the invention the medium is helium, which ensures that cold can be transported throughout the range of temperatures above 4° K. Also the pressure in the system of ducts may be at least 10 atm. and at most 100 atm., which range of pressures provides the most advantageous thermal efficiencies while using ducts with small diameters.

In a further advantageous embodiment of the cold transport device according to the invention, the system of ducts is housed in a vacuum-insulated space in which at least part of this system of ducts is surrounded by one or more radiation screens each consisting of one or more portions. In screening the relevant part of the system of ducts from the wall of the vacuum space, each radiation screen is in heat contact with a further cold source which supplies cold at a higher temperature than the cold source which exchanges heat with the said system of ducts. In this device radiating heat is absorbed in a very advantageous manner by screens surrounding the system of ducts, this radiated heat being compensated for by cold from a cold source, which supplies its cold at a higher temperature. Cold supplied at this higher temperature can be produced at a higher efficiency so that the total efficiency of the device is improved considerably. If, for example, the system of ducts transports cold at the temperature of liquid hydrogen, the further cold source may be formed by a vessel containing liquid nitrogen, the radiating heat then being compensated for at the temperature of liquid nitrogen.

In still another embodiment the heat contact between each radiation screen and the further cold source is formed by a further system of ducts which also contains a gaseous medium under pressure and which also comprises pumping means to circulate this medium. This further system of ducts is in heat-conductive contact with the radiation screens and exchanges heat with the further cold source on the one hand and possibly also with an object to be cooled. In this manner a construction is obtained which may be very compact and in which the heat losses of the cold source at the lowest temperature are very small, even if the cold is transported over a long distance.

According to the invention, each system of ducts has associated with it a pumping device formed by a housing which is divided in two parts by an insulating wall; the first part houses an electric motor which is connected via a shaft passing with clearance through the partition to one or more fans present in the second part, the relevant system of ducts being connected to said second part. The device is constructed in such manner that the same medium as in the system of ducts is present in the entire housing, and also the pressure in this system of ducts prevails in the entire housing. In this manner a very satisfactory seal of the system of ducts and the pumping housing is achieved and it has been found that the gaseous medium surrounding the electric motor has a sufficiently strong thermal conductivity to dissipate the heat from the electric motor to the exterior. According to the invention, the part of the housing accommodating the electric motor may then be arranged outside the vacuum-insulated space so that the heat of the electric motor is directly dissipated to the surroundings. Another possibility is to arrange the electric motor also in the vacuum space, a part of the cold from the cold source then being used as cooling for the electric motor. In this case it is also possible to provide a heat-conductive connection between the motor casing and the outer wall of the vacuum space, along which the heat of the motor is dissipated to the outer wall.

In order to minimize losses of cold from the part of the pumping housing accommodating the fans to the part of the housing accommodating the electric motor, in a further according to the invention the part of the housing of the pumping device situated between the fans and the electric motor may be connected in a heat-conductive manner to a further cold source which supplies cold at a higher temperature than that at which the cold source cooperating with the relevant system of ducts supplies its cold. This further cold source may be the same as that to which the said radiation screens are connected in a heat-conductive manner, and in this manner heat leaking towards the system of ducts is again absorbed at an intermediate temperature level which is of course more advantageous.

In a cold transport device in which two systems of ducts are present, the one system cooperating with a cold source which supplies its cold at the temperature at which the object must be cooled, and the other system of ducts cooperating with a further cold source which supplies its cold at a higher temperature, two pumping devices may be present one in each system of ducts, or only one pumping device may be present in an advantageous embodiment which is formed by a housing which is divided into three parts by two insulating walls. The first part houses an electric motor which is connected via a shaft passing with clearance through the two partitions to one or more fans rotatable within the second part of the housing, and to one or more fans rotatable within the third part of the housing. The system of ducts is connected to the second part of the housing which is located between the electric motor and the third part of the housing, this system cooperating with the further cold source, while the system of ducts transporting cold from the cold source to the object to be cooled is connected to the third part of the housing. This does not only result in a more compact construction, but also the part of the pump housing cooperating with the system of ducts having the lowest temperature is automatically insulated from the part of the pump housing accommodating the electric motor.

In another embodiment the electric motor of the pumping device rotates at a high number of revolutions, the fans then having a small diameter, and the connection shaft is then made of a poorly heat-conductive material. The housing accommodating the electric motor and fans may then also have a small diameter so that losses of cold through the wall of the housing will be small. In this case the electric motor and the bearing of the shaft may be at room temperature, the housing on the side of the fans being closed and the housing on the side of the motor being provided with a cover which permits mounting of the pump.

In a further advantageous embodiment the object to be cooled is formed by at least part of the wall of a high-vacuum space which is surrounded by a further vacuum space in which the radiation screen surrounding the high-vacuum space is arranged, said radiation screen being in heat contact with the second system of ducts cooperating with the further cold source. In this manner an extremely advantageous device is obtained in which a high vacuum can quickly be created and maintained in the high-vacuum space.

In order that the invention may be readily carried into effect, it will now be described in detail, by way of example, with reference to the accompanying drawings, in which:

FIGURE 2 shows a cold transport device as shown in FIGURE 1 which is now, however, partly surrounded by radiation screens being in heat-conductive contact with a further system of ducts which exchanges heat with fluid nitrogen in a vessel surrounding the vessel containing fluid hydrogen.

FIGURE 3 is a sectional view taken along line III—III of the device of FIGURE 2, FIGURE 4 shows the device of FIGURE 2 in which now, however, only a pumping device for both systems of ducts is present.

Figure 1:
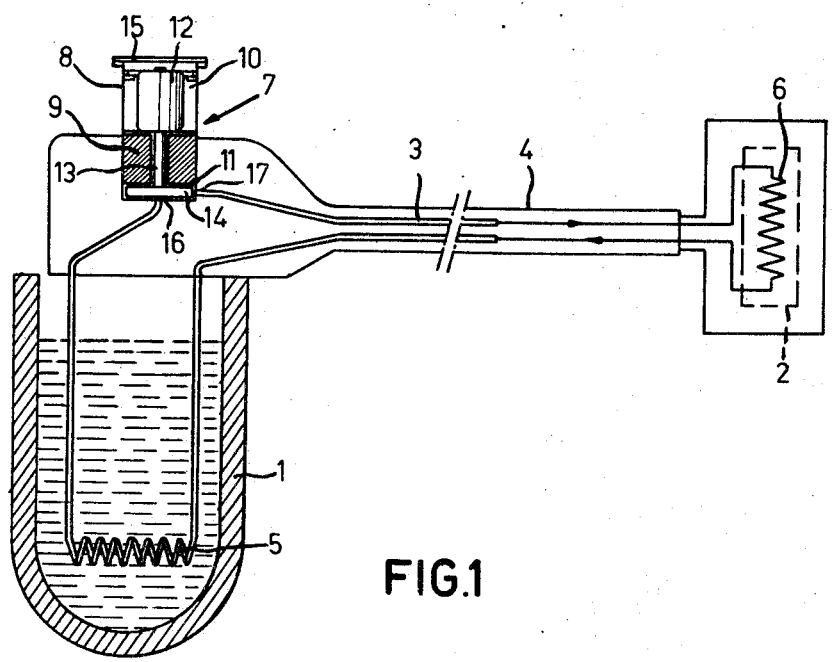
FIGURE 1 shows a cold transport device which transports cold between a vessel containing fluid nitrogen and an object to be cooled.

In FIGURE 1 a Dewar vessel containing fluid hydrogen is indicated by the reference numeral 1. An object to be cooled is indicated by the reference numeral 2. The system of ducts 3 which is partly incorporated in a vacuum-insulated space 4, exchanges heat with the liquid hydrogen at 5, and with the object 2 to be cooled at 6. Gaseous helium is present in this system of ducts at a pressure of 25 atm. The system of ducts includes a pumping device 7 consisting of a housing 8, which is divided into two parts 10 and 11 by an insulating partition 9, the part 10 housing an electric motor 12 which is connected to a fan 14 through a shaft 13 which passes with clearance through the partition 9. The system of ducts 3 is connected to the part 11 of the housing 8 at 16 and 17. The upper side of the housing 8 is provided with a cover 15. After removal of this cover the electric motor 12, partition 9 and fan 14 may be removed from the housing or arranged therein. Due to the rotation of the fan 14 the medium in the system of ducts 3 is caused to circulate substantially assuming the temperature of the liquid hydrogen at 5, and is then led through the pumping device to the object to be cooled, where it gives off cold to this object to be cooled, thus maintaining it at a low temperature. Since the medium in the system of ducts 3 is a high-pressure gas it can be circulated by the pumping device with low losses, that is to say, with a high thermal efficiency in case of a comparatively small diameter of the ducts, for example, inside diameter 6 mms., even if the distance between the vessel 1 and the object 2 to be cooled is long for example, 10 m. Furthermore, this device may be used not only for liquid hydrogen, but for all temperatures above 4° K. The housing 8 of the pumping device 7 contains the same medium as in the system of ducts, the housing 8 entirely forming part, as it were, of a system of ducts so that no sealing difficulties are experienced due to rotating or reciprocating parts led to the exterior. It has been found that the heat of the electric motor 12 can easily be dissipated to the exterior through the gaseous helium surrounding this motor. The fan 14, partition 9 and electric motor 12 can easily be slipped into or out of the housing 8 after removal of cover 15.

The electric motor 12 including the bearing for the shaft 13 is always at room temperature which is extremely advantageous especially for the bearing, because ordinary ball-bearings can then be used. The electric motor can rotate at high speed so that the fan 14 may have a small diameter. This also results in a small diameter of the housing 8 so that consequently loss of cold through the wall of said housing is limited.

Figure 1B:
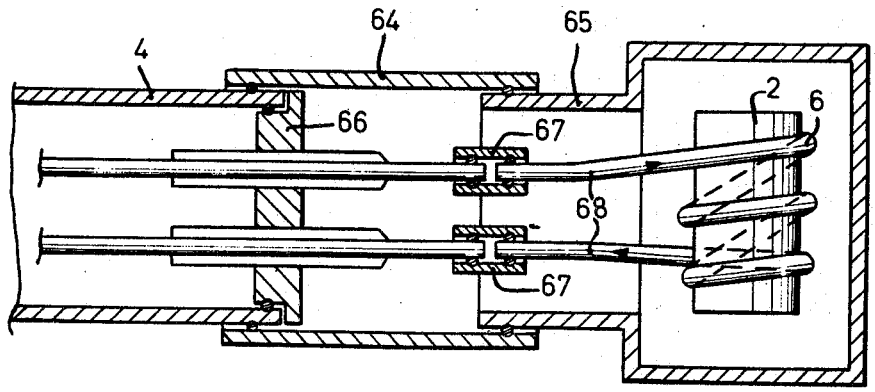
FIGURE 1b is a detailed sectional view of a part of the apparatus in FIG. 1.

The object 2 to be cooled may either be arranged outside the vacuum space 4 or within it, and as is shown on an enlarged scale in FIGURE 1b it is also possible to incorporate the object 2 to be cooled together with the ducts exchanging heat therewith in a separate vacuum space and to apply detachable couplings between the several parts. This is shown in FIGURE 1b, from which it can be seen that the vacuum space 4 is connected through a connection sleeve 64 to vacuum space 65 which surrounds object 2. The vacuum space 4 is closed by cover 66 through which the ducts of the system of ducts 3 pass which are connected through sleeves 67 to the duct 68 which exchanges heat with object 2. By this construction the object 2 to be cooled can easily be detached from the cold transport device and replaced by another object to be cooled.

FIGURE 2 shows a device similar to that of FIGURE 1, the components of which are also indicated by the same reference numerals as in FIGURE 1. Furthermore the device comprises a vessel 20 which surrounds the vessel 1 and which contains liquid nitrogen. Furthermore another system of ducts 22 is present which exchanges heat with the liquid nitrogen at 23 and is also incorporated in the vacuum space 4. Ducts 22 are thus in heat-exchanging contact with a radiation screen secured to the ducts, the screen consisting of two parts 24 and 25 which screens the system of ducts 3 from the wall of the vacuum space 4. The further cold parts are screened by a radiation screen 27 which is also in heat contact with the system of ducts 22. A pumping device 26 is included in the system of ducts 22, which device is structurally entirely identical to the pumping device 7 included in the system of ducts 3. A further particular is that the system of ducts 22 is brought in heat-exchanging contact, at 28, with the housing 8 of the pumping device 7. In this device radiating heat is absorbed by the radiation screens 21 and 25 which are at the temperature of liquid nitrogen. The radiating heat is thus compensated for by the liquid nitrogen while the loss of cold will be considerably reduced at the lower temperature of the fluid hydrogen. This of course results in an improvement of efficiency of the device, because cold at the temperature of liquid nitrogen can be produced with a considerably better efficiency than cold at the temperature of liquid hydrogen. Heat leaking in through the housing of the pumping device 7 is also obviated because the system of ducts 22 exchanges heat with said housing at 28 so that the heat leaking through said housing towards the fan is absorbed for the greater part at the temperature of liquid nitrogen.

In this installation the object to be cooled is enclosed a high-vacuum space 70. The system of ducts 3 is in heat contact with the wall of space 70 so that said wall is cooled at substantially the temperature of liquid hydrogen. At this temperature the wall will reduce the vapour tension of the different gases in space 70 to a very low value so that a high vacuum is obtained very quickly. Surrounding the space 70 is a further vacuum space 71 in which a radiation screen 72 is disposed which is in heat contact with the system of ducts 22 and will thus assume approximately the temperature of liquid nitrogen. The coupling between the cold transport device and the vacuum spaces 71 and 72 and the portions of ducts present therein may again be constructed in the manner as shown in FIGURE 1b.

FIGURE 4 shows a device which in broad outline corresponds to the device of FIGURE 2, except that only one pumping device 30 is present, this device comprising a housing 31 which is subdivided into three parts 34, 35 and 36 by insulating partitions 32 and 33. The electric motor 37, disposed in the part 34, is connected through a shaft 38 passing with clearance through the partitions 32 and 33, to a fan 40 arranged in the part 33 and a fan 39 disposed in the part 36. The system of ducts 3 is connected to the part 36 while the system of ducts 22 is connected to the part 35. In this manner not only a simpler construction is obtained but also the part 36 which forms part of the system of ducts 3 containing the medium of the lowest temperature, is insulated from the electric motor 37.

Figure 5:
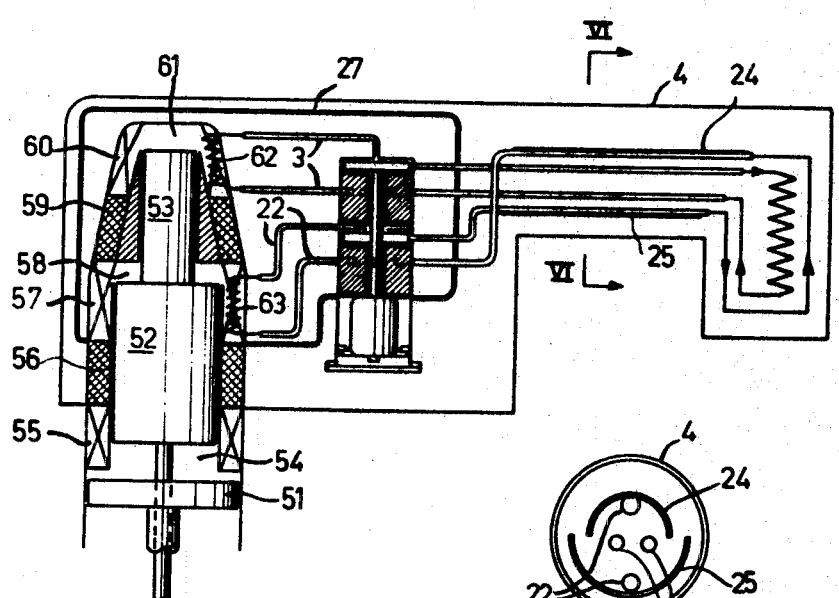
FIGURE 5 shows a device as shown in FIGURE 4 in which the cold source is formed by a cold-gas refrigerator having two expansion spaces.
Figure 6:
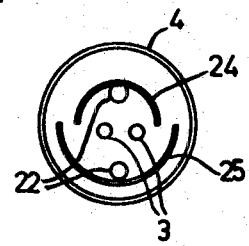
FIGURE 6 is a sectional view taken along line VI—VI of FIG. 5.

FIGURE 5 shows a device similar to that of FIGURE 4, in which now, however, the cold source is formed by a two-stage refrigerator. This refrigerator which is shown only in part, comprises a piston 51 and a displacer consisting of two portions 52 and 53 of different diameters. A compression space 54 is located above the piston 51 which space communicates with an intermediate expansion space 58 through a cooler 55, a first regenerator 56 and a first freezer 57. The intermediate expansion space 58 communicates with the final expansion space 61 through a second regenerator 59 and a second freezer 60. The refrigerator supplies cold in the expansion space 58 at a temperature of, for example, 70° K., while cold is supplied in the expansion space 61 at a temperature of, for example, 20° K. The system of ducts 3 exchanges heat at 62 with the freezer 60, while the system of ducts 22 exchanges heat at 63 with freezer 57. The further operation and construction of this device is fully identical with that of the FIGURES 2 and 4.

After the foregoing it will be evident that the invention provides an extremely simple cold transport device with which cold can be transported over a long distance from a cold source to an object to be cooled with extremely satisfactory thermal efficiency and at very low temperatures.

What is claimed is:
1. In a cold transport apparatus suitable for use with a gaseous medium circulatable between a primary cold source and an object to be cooled, the improvement in combination therewith comprising:
   (a) a primary duct system extending between the cold source and the object to be cooled,
   (b) a primary device for circulating the medium through the duct system, the device comprising (1) a pump for continuously displacing the medium with the pressure thereof being higher than atmospheric pressure throughout the duct system, (2) drive means for operating the pump; and (3) a casing having first and second parts and an insulating partition therebetween for enclosing the pump and drive means respectively,
   (c) a vacuum-insulated housing disposed about said first casing part including the pump and at least a major part of the duct system, providing space therein insulated from room temperature, with the pump's drive means being disposed outside the vacuum-insulated housing and being operable at room temperature.

2. Apparatus as defined in claim 1 further comprising a second cold source having a temperature higher than the primary cold source, and at least one radiation screen disposed between at least parts of the primary duct system and an interior wall of the vacuum-insulated housing, the second cold source being connected to the screen for supplying cold thereto.

3. Apparatus as defined in claim 2 for use with a second gaseous medium and further comprising a second duct system extending between the second cold source and each screen, and a second device similar to the primary device for circulating the second medium through said second duct system.

4. Apparatus as defined in claim 3 wherein said first and second devices comprise first and second pumps and a single drive means for both pumps.

5. Apparatus as defined in claim 1 wherein said gaseous medium is maintained at between 10 and 100 atm. pressure.

6. Apparatus as defined in claim 1 wherein said gaseous medium is helium, and said primary cold source is liquefied hydrogen.

7. Apparatus as defined in claim 2 in combination with a two-stage refrigerator having two freezers in which a gas is successively expanded, which freezers comprise the first and second cold sources respectively.

8. Apparatus as defined in claim 2 wherein said second cold sources comprise liquefied nitrogen.

9. Method of transporting cold from a primary cold source to an object to be cooled, comprising the steps:
   (a) flowing a gaseous medium in primary ducts between the source and object by pump means actuated by drive means, and
   (b) enclosing the primary ducts and pump means with a vacuum-insulated housing, for maintaining same at a temperature substantially as low as that of said cold source, said drive means being operable at atmospheric pressure and temperature.

References Cited
UNITED STATES PATENTS

| | | | |
|---|---|---|---|
| 3,006,157 | 10/1961 | Haettinger et al. | 62—514 |
| 3,055,191 | 9/1962 | Dennis | 62—514 |
| 3,399,691 | 9/1968 | Schoch et al. | 62—55 |
| 3,364,687 | 1/1968 | Kolm | 62—467 |

LLOYD L. KING, Primary Examiner

U.S. Cl. X.R.

62—467, 514